Figure 1:
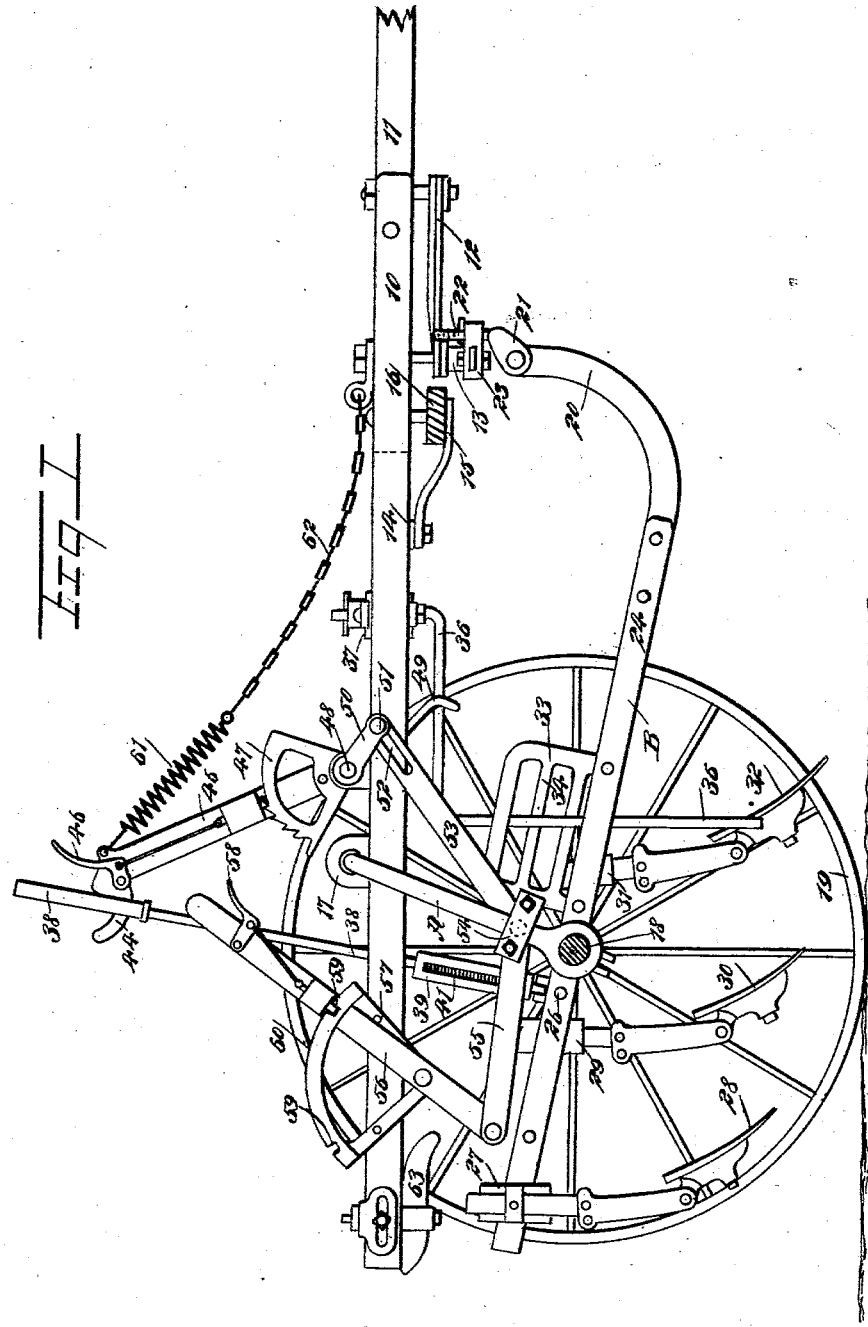

No. 633,906. Patented Sept. 26, 1899.
L. P. RIFE.
CULTIVATOR.
(Application filed Apr. 15, 1899.)
(No Model.) 3 Sheets—Sheet 1.

WITNESSES:
H. Walker
J. A. Decker

INVENTOR
Louis P. Rife
BY
Munn
ATTORNEYS.

THE NORRIS PETERS CO., PHOTO-LITHO., WASHINGTON, D. C.

No. 633,906.  
L. P. RIFE.  
CULTIVATOR.  
(Application filed Apr. 15, 1899.)

Patented Sept. 26, 1899.

(No Model.)

3 Sheets—Sheet 2.

Fig. 2.

WITNESSES:  
H. W. Walker

INVENTOR  
Louis P. Rife  
BY  
Munn  
ATTORNEYS.

No. 633,906. Patented Sept. 26, 1899.
L. P. RIFE.
CULTIVATOR.
(Application filed Apr. 15, 1899.)
(No Model.) 3 Sheets—Sheet 3.
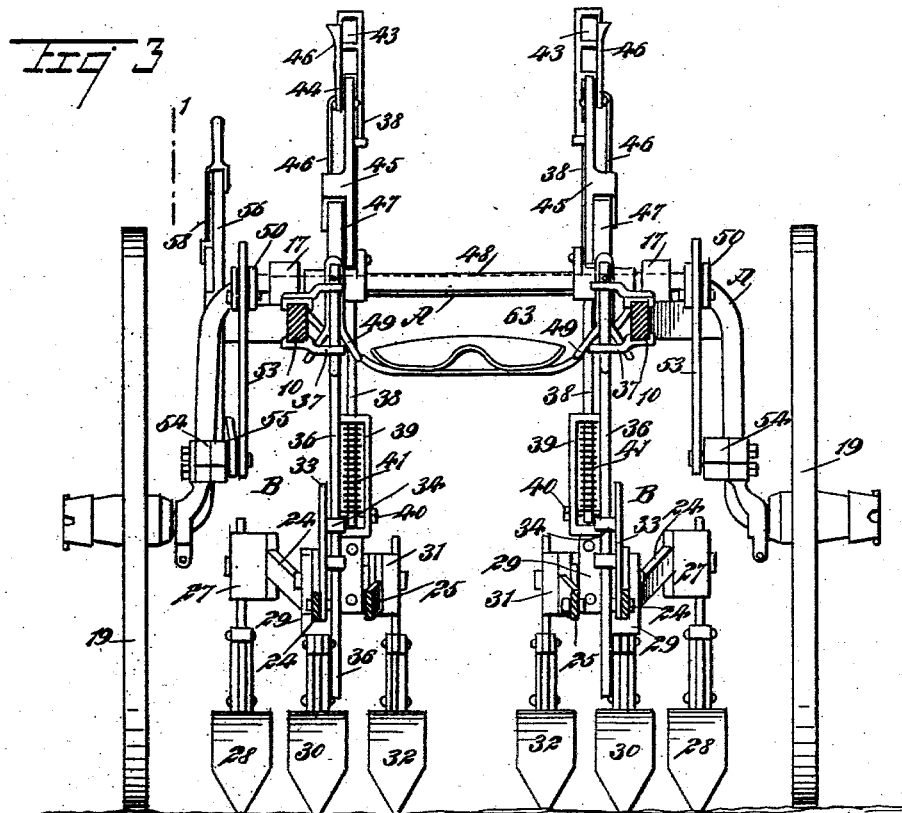
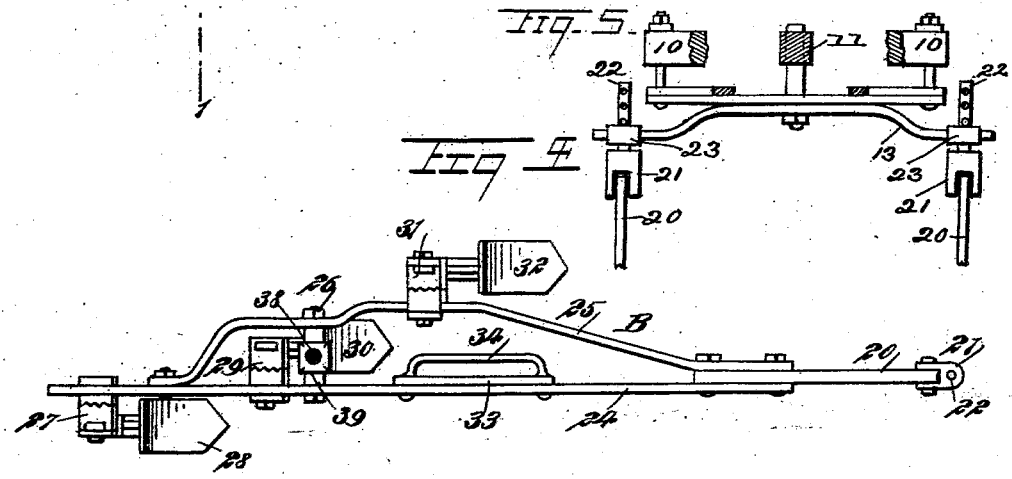
WITNESSES: INVENTOR
Louis P. Rife
BY
ATTORNEYS.

UNITED STATES PATENT OFFICE.

LOUIS P. RIFE, OF DEFIANCE, OHIO, ASSIGNOR TO THE CLIPPER PLOW COMPANY, OF SAME PLACE.

CULTIVATOR.

SPECIFICATION forming part of Letters Patent No. 633,906, dated September 26, 1899.

Application filed April 15, 1899. Serial No. 713,122. (No model.)

*To all whom it may concern:*

Be it known that I, LOUIS P. RIFE, of Defiance, in the county of Defiance and State of Ohio, have invented a new and Improved Cultivator, of which the following is a full, clear, and exact description.

My invention relates to that class of weed-cultivators in which provision is made for the driver's weight to balance and take from the necks of the team the weight of the pole and the downward drag of the shovel-beams. In this class of cultivators when the suspended shovels or teeth are in the ground the weight and downward pull of the pole on the necks of the team are greater than when the shovels or teeth are out of the ground.

The principal object of the invention is to provide economic and convenient means for shifting the axle to and fro by the same movement by which the cultivator shovels or teeth are raised or lowered, thus shifting the fulcrum so that the weight and downward pull of the pole upon the necks of the horses may be kept practically uniform regardless of whether the shovels or teeth are raised or lowered.

Another object of the invention is to provide a means whereby the axle may be shifted and the shovel-beams simultaneously raised or lowered either by hand or by horse power or whereby either or both of the shovel-beams may be raised independently of the movement of the axle.

Another object of the invention is to provide a tension device so applied to the levers controlling the movement of the shovel-beams that neither the team nor the driver need raise the dead-weight of the shovel-beams.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the machine, taken practically on the line 1 1 of Fig. 3, the shovel-beams being elevated. Fig. 2 is a section similar to Fig. 1, the shovel-beams being illustrated as lowered and the shovels as in the ground. Fig. 3 is a transverse vertical section taken practically on the line 3 3 of Fig. 2. Fig. 4 is a plan view of one of the shovel-beams and its attached shovels and a horizontal section through a hanger-rod used in connection with such beam, and Fig. 5 is a detail view illustrating the arch connected to the auxiliary frame and the parts attached to said arch.

The main frame of the machine consists of two diverging horizontal side beams 10, which side beams are made to approach at the front and are secured to the pole or tongue 11 in any approved manner. An auxiliary frame 12 is pendent from the forward portion of the main frame, and this pendent or auxiliary frame 12 has attached to it an arch 13, the ends whereof are straight. A cross-bar 14 connects the side pieces of the main frame, the cross-bar being located between the center of the main frame and the auxiliary or pendent frame 12; and a pivoted arm 15 for the doubletree 16 is attached to the said cross-bar 14.

A yoke or arched axle A is provided in connection with the frame, the horizontal members or sections of which axle are journaled in suitable bearings 17, carried by the side bars of the main frame, and the spindles 18 of the crank or arched axle are adapted to carry ground-wheels 19. One or more shovel-beams B may be used in connection with the device, two of such beams being shown in the drawings. Each beam is preferably constructed as illustrated in detail in Fig. 4, wherein the body of the beam consists of a straight front beam 20, having its forward end upwardly curved and pivotally attached to an arm 21, said arm being provided with an upwardly-extending pin 22, which pin is passed through a bearing 23, located at an end of the front arch 13. The pin 22 is adjustably held in the said bearing.

In addition to the front upwardly-curved bar 20 the shovel-beam consists of a straight outer bar 24, attached to the outer face of the front bar 20, and an inner curved bar 25, secured at one end to the inner face of the front bar 20 and at its rear end to the outer bar 24 at a point near the rear extremity of said outer bar. A pin 26 is passed through the two bars 24 and 25 at a point between their centers and their rear ends, and a clutch 27 of any approved description is shown as secured upon the rear end of the straight bar 24 of the shovel-frame in such manner that the shovel 28, connected with the clutch, will be outside of the vertical plane of the outer face of said outer bar, while another clutch 29 is secured to said outer bar 24 of the shovel-beam, and this second clutch extends into the space between the two bars 24 and 25 and carries the shovel 30, which is at the inner side of the outer bar 24, and a third clutch 31 is secured to the inner curved bar 25, the shovel 32, carried by this latter clutch, being opposite the inner face of the said inner bar 25, so that the various shovels 28, 30, and 32 are in stepped arrangement.

A vertical yoke 33 is secured to the outer bar 24 of each shovel-beam, and each yoke is provided upon its inner face with a series of loops 34, and the lower vertical member of a guide-rod 36 is made to pass through the loops of each yoke 33, and each of said guide rods or bars is provided with an upper vertical member that is journaled in any suitable manner in boxes 37, that are adjustably secured to the side beams of the main frame. These guide-bars 36 serve to prevent the shovel-beams having too much swing, and when the said shovel-beams are raised the guide-bars 36, in connection with devices to be hereinafter described, hold the shovel-beams steady in their upper position.

Each of the shovel-beams is provided with a hanger-rod 38, and each hanger-rod is made to enter a vertical chamber in a casing 39, the said casing having slots in opposite sides through which pins 40 extend that are passed through the hanger-rods, and springs 41 are coiled around the ends of the hanger-rods entering the casings, having bearing against said pins 40 and the upper ends of the casings. These springs serve to cushion the hanger-rods and ease the said rods as they are brought into play to lift the shovel-beams. The casing 39 of each hanger-rod is pivotally attached to a block 42 in such manner that said hanger-rods may have lateral movement, and the blocks 42 are pivoted on the pins 26 on the shovel-beams in such manner that said blocks may have forward-and-rearward movement. Thus the hanger-rods have virtually a swivel connection with the shovel-beams.

A series of apertures 43 is provided at the upper end of each hanger-rod, and the nose 44 of the head portion of a hand-lever 45 is made to pass through one of the apertures provided for each of the hanger-rods, the extent to which the shovel-beams are to be lifted being regulated by the connection between the hand-levers 45 and the upper portion of said hanger-rods. Each hand-lever 45 is provided with a thumb-latch 46, the thumb-latches being adapted to engage with racks 47, and these racks are secured upon a shaft 48, suitably journaled upon the side beams of the main frame in front of the upper portion of the axle A, and a fork 49 is projected downward from the shaft 48 near each of its ends, and these forks extend over the guide-rods 36 when the shovel-beams are raised, holding said beams against lateral movement.

A crank-arm 50 is secured to each end of the shaft 48, and these crank-arms are provided with pins 51, that extend through slots 52 in the upper ends of draw-bars 53, and these draw-bars are pivotally attached to shoes 54, said shoes being secured to the vertical portions of the axle A. A link 55 is pivoted to one of the shoes, preferably the right-hand shoe, at the same point where the draw-bar 53 is pivoted, the said link being made to extend rearward, while the draw-bars extend upwardly and forwardly. The link 55 is pivoted at its rear end to a hand-lever 56, and this lever is fulcrumed upon a suitable support 57 at the right-hand side of the main frame, the hand-lever being provided with a thumb-latch 58, adapted to engage with any one of a series of apertures 59, made in a rack-bar 60, also supported by the main frame of the machine.

Springs 61 are attached to the upper portions of the hand-levers 45, and these springs extend forwardly and downwardly and are connected with the front portion of the main frame through the medium of chains 62 or their equivalents. When the shovels are in the ground, as shown in Fig. 2, the springs 61 are placed under tension, and when the thumb-latch of the rear hand-lever 56 is carried out of engagement with the rack-bar 60 the springs 61 will assist in raising the shovel-beams to their upper position when the driver forces the said lever 56 as far forward as possible, as illustrated in Fig. 2; but this result may be automatically accomplished by the assistance of the team, since when the thumb-latch of the lever 56 is disengaged from the rack-bar 60 and the team draws ahead the axle will be given a forward inclination at its top and a rearward inclination at its bottom, and the hanger-rods will be drawn upward by the forward movement of the levers 45, connected with the beams through the draw-bar connection between the crank-arms 50 of the rock-shaft 48 and the vertical members of the axle A.

It is evident that the springs 61 are necessary to the perfect working of the cultivator, as they impart life to the shovel-beams and assist very materially in raising them. Without them the shovel-beams would be dead and the operator would be obliged to raise the dead-weight.

Assuming that the operator is in his place in the seat 63, which is suspended between the rear portions of the side beams of the main frame, and that his weight exactly balances the weight of the pole, it is clear that if the frame be moved forward in its bearings and the lower part of the axle shifted nearer the operator the pole will press downward, while if the lower part of the axle be shifted in the opposite direction the fulcrum will be shifted away from the driver and the tongue will press upward. Thus it will be seen that by moving the lower part of the axle to and fro the weight of the pole upon the horses may be adjusted as desired.

It is evident that either one of the shovel-beams may be adjusted vertically as required by moving the lever 45, belonging to the beam, either in a forward or in a rearward direction. When the thumb-latch on the axle-lever 56 is disengaged from the rack-bar 60, the lower part of the axle moves backward just beyond its center before the shovel-beams begin to rise, and the weight of the driver in his seat, in connection with the draft of the horses, raises the shovel-beams without any effort on the part of the operator.

The only time the slots 52 in the draw-bar 53 are brought into use is when both shovel-beams are raised at one time by disengaging the thumb-latch 58 of the lever 56 from the rack 60 and throwing it forward, as shown in Fig. 1. The object of the slots 52 in the draw-bar 53 is to allow the lower part of the axle to move backward just beyond its center before the shovel-beams begin to rise. It will be readily understood that it is much easier to raise the shovel-beams after the lower part of the axle has passed beyond the center than it would be if the shovel-beams began to rise at the same time that the lower part of the axle began to move backward.

The arrangement of the notches on the racks 47 permits the lever 45, which is pivoted to the lower part of the rack 47, to have a free upward movement with the assistance of the springs 61. Under the arrangement of the notches in the rack 60 when the thumb-latch 58 of the lever 56 is disengaged from the rear end of the rack 60 there will be no obstruction until the lever reaches the front end of said rack 60.

With reference to a plan for regulating the regular depth of cultivating this is accomplished by raising or lowering the upper part of the hanger-rods 38 on the nose of the head portions of the hand-levers 45 and the upward-and-downward movement of the pins 22 at the front ends of the shovel-beams. It often becomes necessary to cultivate deeper at some places in a field than the regular set depth. This is accomplished by unlatching the latches 46 on the levers 45 and allowing one or both levers 45 to move downward one, two, three, or more notches on the racks 47, as occasion may require. When regular ground-surface is again reached, the lever or levers 45 are pushed upward to their original place.

Having thus described my invention, I claim as new and desire to secure by Letters Patent—

1. A frame, a shifting fulcrum for the frame, a shovel or toothed beam carried by the frame and raised and lowered through the medium of said shifting fulcrum and means for raising and lowering the beam independent of the movement of said fulcrum.

2. A frame, a shifting fulcrum for the frame capable of operation by hand or by the team, shovel or toothed beams raised and lowered through the medium of the shifting fulcrum, means for raising and lowering the beams independent of the movement of the shifting fulcrum, and tension devices normally influencing the beams in an upwardly direction.

3. A frame, a shifting fulcrum for the frame, a shovel or toothed beam, a hanger-rod connected with the beam, a lever connected with the hanger-rod, and connections between the said lever and the shifting fulcrum whereby the shovel or toothed beam is raised and lowered by the movement of the shifting fulcrum, the said lever having movement independent of the movement of the shifting fulcrum, to raise and lower the hanger-rod and beam.

4. In a cultivator, a support, a toothed or shovel beam pivotally attached to said support, a guide-rod connected with the said beam and with the said support, means for raising and lowering the said beam, and a fork extending over the guide-rod when the beam is raised to hold the beam against lateral movement.

5. In a cultivator, a support, a toothed or shovel beam pivotally attached to said support, a pivoted guide device connected with the said beam and with the said support, a locking device for the guide device, and means, substantially as described, for raising and lowering the said beam, as set forth.

6. In a cultivator, a support, a toothed or shovel beam pivotally attached to said support, a yoke secured to said shovel-beam and provided with a series of loops, a guide-rod passing through the loops of said yoke, means for raising and lowering the said beam, and a device for engaging the guide-rod when the beam is raised, substantially as set forth.

7. In a cultivator, the combination with a frame-supporting mechanism adapted for swinging movement forwardly and rearwardly and shovel or toothed beams, of hanger-rods connected with the said beams and provided with apertures at their upper ends and hand-levers each provided with a nose adapted to engage one of the apertures in the corresponding hanger-rod, as set forth.

8. In a cultivator, the combination with a frame, a shifting fulcrum for the frame, a device for adjusting the said fulcrum and shovel or toothed beams, of hanger-rods connected with the beams, levers each provided with a nose adapted to engage an aperture in the corresponding hanger-rod, and tension devices acting on the said levers to normally draw the said beams in an upwardly direction, as described.

9. In a cultivator, a shifting fulcrum for the frame, a device for adjusting said fulcrum, and shovel or toothed beams raised and lowered by the movement of said shifting fulcrum, in combination with auxiliary devices for raising and lowering the said beams independent of the said shifting fulcrum, tension devices acting to normally draw said beams in an upwardly direction, pivoted guide devices for the said beams, and a locking mechanism for said guide devices, said locking mechanism acting upon said guide devices when said beams are elevated, as set forth.

10. In a cultivator, the combination with a wheeled support, and toothed or shovel beams pivotally attached to said support, of levers adapted to raise and lower the said beams, and hanger-rods adjustably connected with said levers, the said hanger-rods being cushioned and connected with said beams to have lateral movement and forward-and-rearward movement, for the purpose specified.

11. In a cultivator, the combination, with a support, toothed or shovel beams pivotally attached to said support, and levers adapted to raise and lower the said beams, of hanger-rods adjustably connected with said levers, bearings pivotally connected with said beams, casings pivotally connected with said bearings, said casings receiving the lower ends of the hanger-rods, said rods having sliding movement in said casings, and springs located within the casings and connected with the said hanger-rods, as and for the purpose specified.

12. In a cultivator, the combination, with a support, toothed or shovel beams pivotally attached to said support, and levers adapted to raise and lower the said beams, of hanger-rods adjustably connected with said levers, bearings pivotally connected with said beams, casings pivotally connected with said bearings, said casings receiving the lower ends of the hanger-rods, said rods having sliding movement in said casings, springs located within the casings and connected with the said hanger-rods, and tension devices connected with said levers and with the forward portion of said support for the shovel or toothed beams, as described.

13. A frame, a shifting fulcrum for the frame, means for adjusting said fulcrum, shovel or toothed beams carried by the frame, hanger-rods connected with the beams, levers connected directly with the hanger-rods, and a connection between the said levers and the shifting fulcrum, substantially as set forth.

14. The combination with a frame, a shifting fulcrum for the same, means for adjusting said fulcrum, and shovel or toothed beams carried by the frame, of racks secured to a shaft journaled in the frame, a crank-arm at each end of the shaft a connection between each of said crank-arms and the shifting fulcrum, levers, means for locking the levers to the racks and a connection between each of said levers and the corresponding beam, substantially as described.

15. In a cultivator, a frame, an arched axle forming a shifting fulcrum for the frame, shovel or toothed beams, hanger-rods connected with the beams, levers connected with the hanger-rods and each provided with a thumb-latch adapted to engage a rack secured to a shaft journaled in the main frame, a crank-arm at each end of the shaft and provided with a pin and draw-bars pivoted at their lower ends to shoes secured to the vertical portion of the arched axle the said draw-bars extending upwardly and forwardly and provided with slots at their upper ends through which the pins on the said crank-arms pass, substantially as described.

16. In a cultivator, a frame, an arched axle forming a shifting fulcrum for the frame, shovel or toothed beams, hanger-rods connected with the beams, levers connected with the hanger-rods and each provided with a thumb-latch adapted to engage a rack secured to a shaft journaled in the main frame, a crank-arm at each end of the shaft and provided with a pin, draw-bars pivoted at their lower ends to shoes secured to the vertical portion of the arched axle, the said draw-bars extending upwardly and forwardly from said shoes and provided with slots at their upper ends through which the pins on the said crank-arms pass and a link pivoted to one of the shoes at the point where the draw-bar is connected, the said link extending rearwardly, and a hand-lever to which the end of the link is pivoted the said hand-lever being provided with locking means, substantially as set forth.

17. In a cultivator a main frame, an auxiliary frame pendent from the forward portion of the main frame, and provided with a bearing, a shovel or toothed beam, having its forward end upwardly curved and an arm pivotally attached to said end of the beam and having an upwardly-extending pin adjustably held in the said bearing, substantially as described.

LOUIS P. RIFE.

Witnesses:
GEO. W. WATKINS,
GODFREY M. WATKINS.